Nov. 15, 1966   R. W. ANTHONY   3,284,909
GEAR CHECKING APPARATUS
Filed May 18, 1964   2 Sheets-Sheet 1
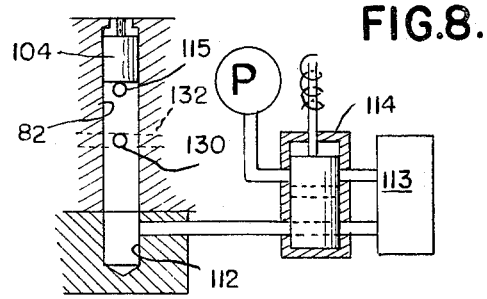
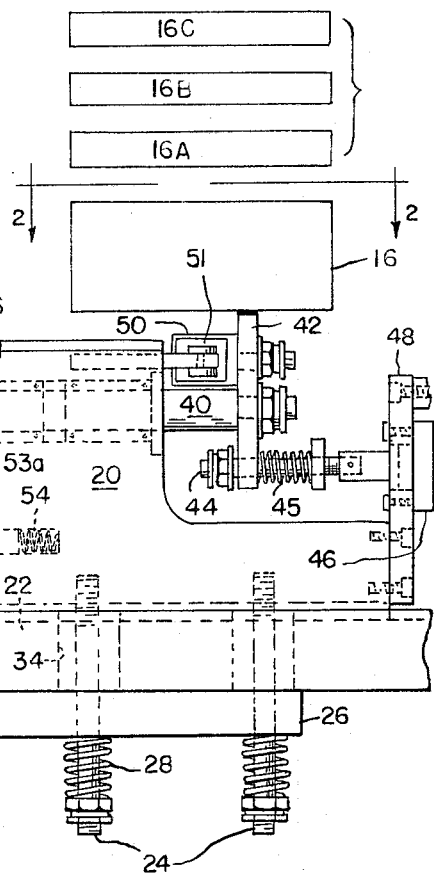
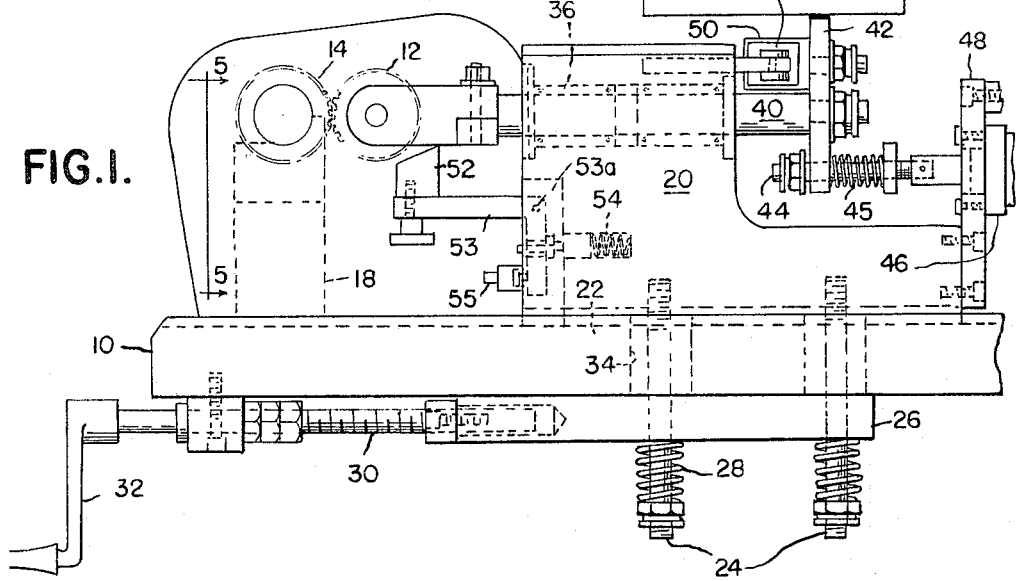
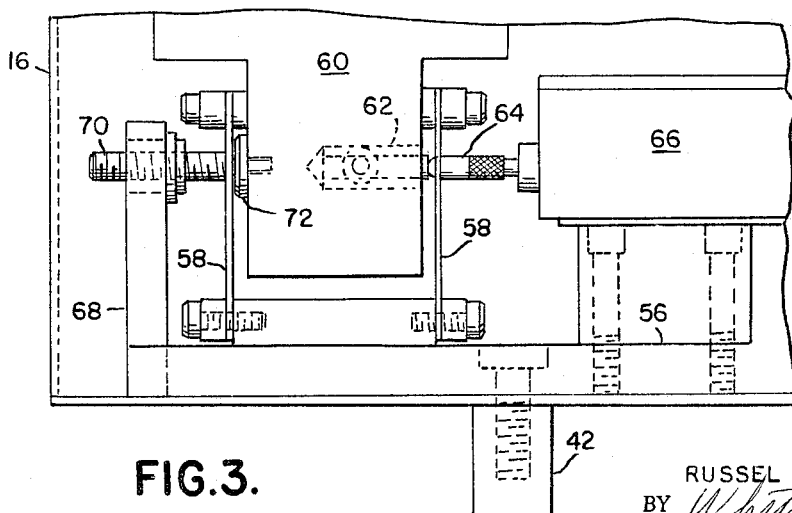
INVENTOR.
RUSSEL W. ANTHONY
BY Whittemore
Hulbert & Belknap
ATTORNEYS

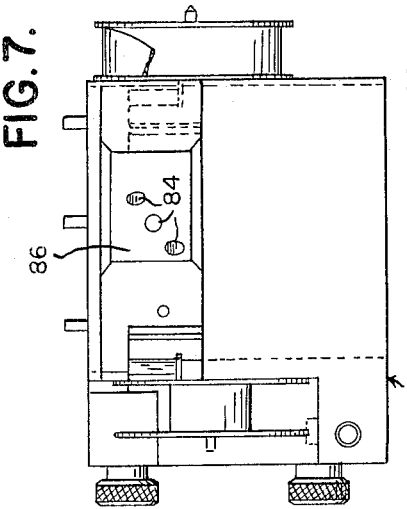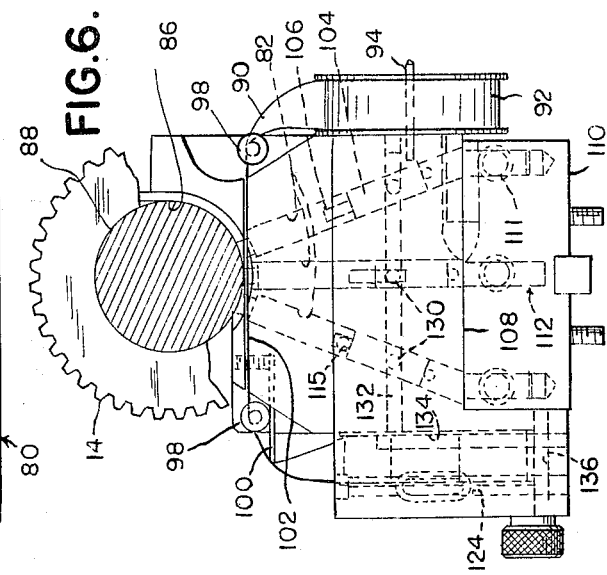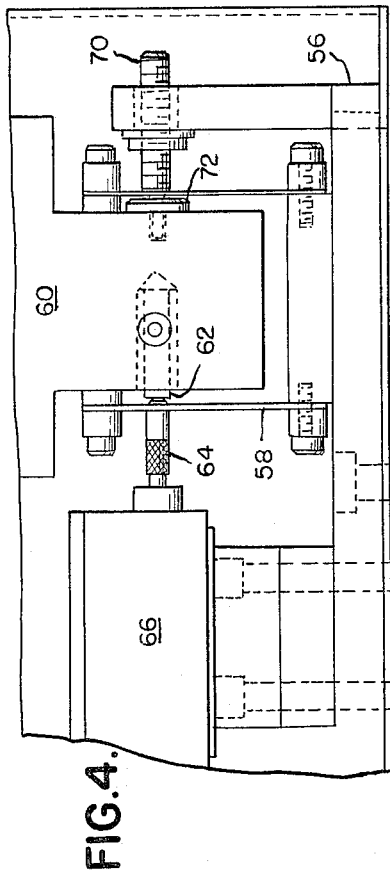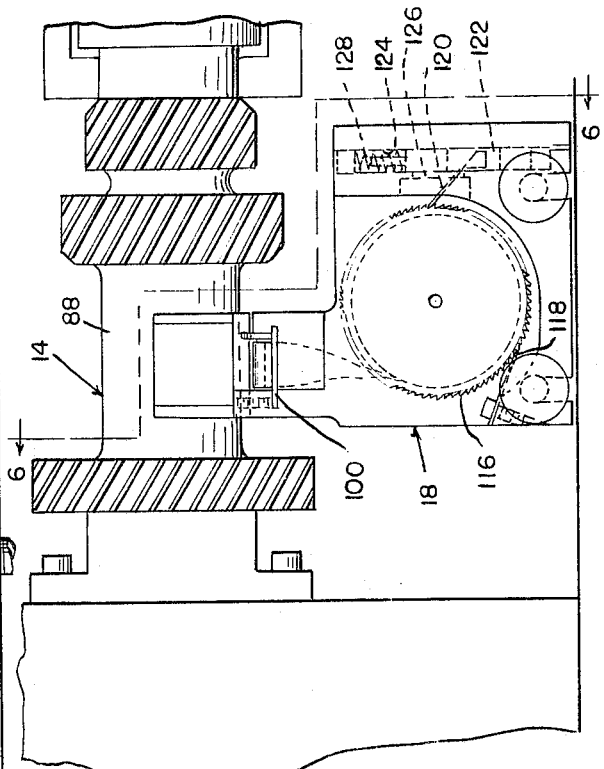

Patented Nov. 15, 1966

3,284,909
GEAR CHECKING APPARATUS
Russel W. Anthony, Detroit, Mich., assignor to National Broach & Machine Company, Detroit, Mich., a corporation of Michigan
Filed May 18, 1964, Ser. No. 368,184
11 Claims. (Cl. 33—179.5)

The present invention relates to gear checking apparatus and more particularly, to apparatus designed to check for nicks on gear teeth and to provide a mark on the gear to indicate the location of the nicked tooth.

It is an object of the present invention to provide checking apparatus adapted to sense an abrupt spacing error such as caused by a nick on a tooth, to make a signal upon sensing such error and to provide a mark on the gear to indicate the location of the error.

More specifically, it is an object of the present invention to provide gear checking apparatus as described in the preceding paragraph capable of simultaneously checking a plurality of gears such as a cluster gear, and to provide coded marks on the gears indicating the locations of errors on the several gears.

It is a feature of the present invention to provide mechanical means for sensing tooth spacing errors such for example as caused by nicks including inertia responsive means, and means for marking the gear to indicate the location of the error.

It is a further feature of the present invention to provide apparatus for checking a plurality of gears on a cluster gear simultaneously for nicks on the teeth thereof, and to provide a mark on the gears indicating which of the gears have nicked teeth and further indicating the location of the nick thereon.

It is a further feature of the present invention to provide apparatus as described in the preceding paragraph which comprises a ribbon such as a typewriter ribbon for marking the teeth, and a plurality of plungers each individually actuated by a signal generated by determination of a nick on a particular one of the cluster gears, the plungers being positioned to impinge the tape and to press it against a portion of the cluster gear.

Other objects and features of the invention will become apparent as the description proceeds, especially when taken in conjunction with the accompanying drawings, illustrating preferred embodiments of the invention, wherein:

FIGURE 1 is a fragmentary side elevation of the gear checking device.

FIGURE 2 is a diagram illustrating the relationship of a plurality of checking devices useful for checking cluster gears, as viewed from the line 2—2, FIGURE 1.

FIGURE 3 is an enlarged side elevational view of the inertia mechanism in its position of use.

FIGURE 4 is a view similar to FIGURE 3 illustrating its mechanism reversed for a different operation.

FIGURE 5 is an enlarged fragmentary elevational view looking in the direction of the arrows 5—5, FIGURE 1.

FIGURE 6 is a sectional view on the line 6—6, FIGURE 5.

FIGURE 7 is a plan view of the mechanism illustrated in FIGURE 6.

FIGURE 8 is a diagrammatic view showing air supply to the checker.

Referring first to FIGURES 1-3, the gear checking mechanism comprises a base 10 on which are provided a plurality of gear checking and marking assemblies each comprising gear rolling equipment including a plurality of master gears 12 mounted for rotation and for movement radially of a corresponding work gear 14, inertia means indicated generally at 16 for sensing nicks on the teeth of the work gear, and gear marking mechanism indicated at 18. More specifically, there is provided a generally L-shaped block 20 slidable in ways indicated at 22 provided at the top of the base 10, the block being retained in adjusted position by a pair of posts 24 threaded at their upper ends in the block and carrying an actuator slide 26 which is spring pressed against the bottom of the base 10 by springs 28. The actuator slide 26 has a threaded opening receiving an actuating screw 30 rotatably mounted on the base 10 and adapted to be rotated by a crank 32. Limited horizontal movement of the gear checking units is permitted by virtue of enlarged openings 34 in the base 10 through which the posts 24 extend.

Slidable in bearings 36, which preferably are in the form of ball bushings, is a shaft 40 which at its left hand end as seen in FIGURE 1, mounts the master gear 12 for free rotation. At the end remote from the master gear 12, the shaft 40 carries a vertical plate 42 to the upper end of which the inertia mechanism 16 is rigidly affixed. The plate 42 is connected through a rod 44 and a compression loading spring 45 to an air cylinder 46 rigidly affixed to a plate 48 secured to the block 20. Also carried by the plate 42 is a post 50 having flat sides engageable by rollers 51 which retain the shaft 40 and associated mechanism against rotation during its axial reciprocation.

Mounted adjacent the position of the master gear 12 is a brake block or shoe 52 carried by a bell crank lever 53 pivotally mounted in a recess in block 20 as seen at 53a. The shoe is yieldably biased by a spring 54 into the position shown. When the master gear or gears 12 is or are retracted to the right by the air cylinder means 46 for loading the work gear, each master gear engages a brake shoe 52 which opposes its rotation. The shoe is yieldable downwardly in accordance with spring opposed pivotal movement of the bell crank lever 53. If, when the air cylinder 46 is actuated to permit the spring 45 to shift the master gear toward its associated work gear, it sometimes happens that the master gear does not enter into mesh with the teeth of the work gear, the master gear remains in engagement with the brake shoe, and the rotation of the work gear 14 thus causes the teeth of the work gear to slip off the crests of the teeth of the master gear and thus bring about full mesh. The position of the brake shoe is determined by an adjustable abutment 55 so that when the master gear meshes with the work gear, it has moved out of engagement with the brake by an amount sufficient to permit the anticipated axial movement of the shaft 40 in the gear checking operation without re-engaging the brake shoe.

The present invention is capable of checking single work gears but finds its most effective use in checking cluster gears of the type illustrated in FIGURE 5. It will be appreciated that the gear 14 in FIGURE 1 may be considered any one of the gears of a cluster gear. Suitable means (not shown) are provided for engaging the work piece 14 and rotating it while the several gears thereon are in mesh with corresponding master gears. In order to permit ready loading of the work gear, a preliminary locator may be provided on which shaft portions of the work piece intermediate the gears thereon rest, and if desired, centers may advance to engage the ends of the shaft of the work piece to pick it up into a position of a slight clearance. The marker 18 indicated in FIGURE 1, may include locator structure at the upper end as indicated or the locator may be entirely separate from the marker 18 which will subsequently be described.

If desired, means (not shown) may be carried by the plate 42 for cooperation with fixed means on the block 20 which affords an accurate indication of the position of the shaft 40 and hence affords a correspondingly accurate measurement of the diameter of the work gear 14. This means is not illustrated in the figures because it is well known and may be conveniently provided wherever space permits. It will be appreciated that if a work gear of a predetermined size and having a predetermined eccentricity is mounted in the position of the work gear 14, the master gear 12 will be moved to a position approximately corresponding to the pitch diameter of the work gear. If now, an eccentric work gear 14 is rotated through 360 degrees the master gear 12 will correspondingly be rotated and the shaft 40 will move to the right and left, back to its initial position once during each complete rotation of the work gear 14. When checking for nicks, the work gear is rotated relatively slowly so that the axial movement of the shaft 40 corresponding to run-out or eccentricity, will be correspondingly slow. As is well understood, measuring instruments of the type referred to herein are ordinarily connected with recorders so that the recorder will indicate and record the amount of run-out or eccentricity.

The present invention however, is concerned primarily with means for sensing and locating the position of nicks on the teeth of the work gear or work gears where the work piece is a cluster gear.

Referring now particularly to FIGURE 3 there is illustrated one embodiment of the invention, the inertia checking means indicated at 16 in FIGURE 1 being shown with the housing broken away to expose the operating mechanism. The inertia checker, mounted on the plate 42 as hereinbefore described, comprises a base 56 having two pairs of vertically extending flexible reeds 58 connected thereto to the upper end of which is connected a relatively heavy weight 60. The weight 60 carries a permanent magnet 62 one end of which extends beyond a side surface of the weight and is contacted by the end of the actuating plunger 64 of a sensitive measuring instrument 66 such for example as a linear variable differential transformer. The use of the permanent magnet 62 permits the elimination of the usual bias spring connected to the actuating plunger 64 and maintains the plunger in contact with the magnet on movement back and forth of the weight 60, as will subsequently be described.

Connected to the base 56 is a rigid post 68 carrying an adjustable abutment screw 70 one end of which is engageable with the flat outer surface of the head of an abutment member 72. The adjustable abutment screw 70 is adjusted to provide a very light bias against the resilience of the reeds 58 so as to maintain the part in the relationship illustrated under normal operating conditions. If the mounting plate 42 moves to the right and left as seen in FIGURE 3, at the slow rate resulting from run-out or eccentricity of the work gear, the inertia weight moves with the base 56 and there is no indication or signal on the sensing device 66. If, however, a tooth of the work gear 14 has abrupt tooth-to-tooth spacing error such for example as may result from a nick on the tooth, when this nick passes through the zone of tight mesh with the master gear the master gear will be displaced abruptly to the right with a corresponding abrupt movement to the right of all the mechanism shown in FIGURE 3. The magnitude of this movement will of course depend upon the size of the nick. As soon as the nick has passed through the zone of mesh, the spring 45 causes immediate movement of the plate 42 and the base or support 56 to the left to maintain tight full mesh engagement between the teeth of the work gear and the teeth of the master gear. However, the abrupt movement of the mechanism shown in FIGURE 3 to the right has imparted momentum to the inertia weight 60 and as the base 56 moves abruptly to the left, carrying the sensitive indicator 66 with it, the reeds 58 supporting the weight 60 bend and the plunger 64 of the indicator is depressed by an amount which is a function of the magnitude of the nick.

The mechanism shown in FIGURE 3 may also be adjusted to work when in reverse position, this position being indicated in FIGURE 4 in which corresponding parts are identified by the same reference characters. In this case passage of a nick on a tooth of the work gear through the zone of mesh with the master gear will result in abrupt shifting of the support or base 56 to the right. At this time movement of the inertia weight 60 is opposed only by the very light bias of the reeds 58 and accordingly the weight 60 lags behind. However, during movement of the support 56 and assocated mechanism to the right, the inertia block or weight 60 starts to move to the right and it continues to the right when the support 56 and associated structure returns rapidly to the left under the bias of the spring 45. Thus, as the support 56 approaches the initial position from which it was abruptly displaced by passage of a nick, there is an impact between the adjustable abutment screw 70 and the abutment member 72. This impact causes the inertia weight 60 to move to the left further than its rest position, thus pressing the actuating plunger 64 of the indicator 66 inwardly to cause it to sense the nick. That this operation is as described in the foregoing is established by the fact that normally open switch points may be provided in the indicator 66 having a spacing of approximately .010″. By adjustment of the adjustable abutment screw 70, inertia checking instruments may be set to measure nicks having effective heights of .0010″, .0018″, .0022″, and .0030″. In other words, at the minimum setting, an abrupt back and forth movement of the shaft 40 in an amount corresponding to .0010″ is effective to cause closure of switch points having a normal spacing of .010″.

It will of course be appreciated that nick sensing units of the type illustrated in FIGURES 3 and 4 are provided for each of the master gears, and in FIGURE 2 this arrangement is diagrammatically suggested where the reference characters 16A, 16B and 16C are applied to three narrow side-by-side inertia checking devices each of which is connected to an assocated master gear by a shaft such as the shaft 40 passing through the common mounting block 20.

The switch contacts contained in the sensitive measuring device 66 may be used to provide a visual signal such for example as to light a light indicating which of the gear elements of the cluster gear is nicked, and if desired, to indicate the magnitude of the nick as described above. This light indication normally stays on until the work piece has been removed and replaced with another. Also, as is well understood in the art, the movement of the actuating plunger 64 of the indicator may be amplified and used to provide a permanent record on a chart. Finally, and this is an important feature of the present invention, the movement of the plunger 64 by a mount corresponding to the presence of a nick of unacceptable magnitude is used to energize a marking device so that the work gear is provided with a mark thereon indicating not only the presence of a nick which renders the gear as a whole unacceptable, but also indicating which one or more of the gears is nicked, and finally, indicating with considerable accuracy the exact location of the tooth which is nicked.

The mechanism for performing this last described function is best illustrated in FIGURES 5–7 and comprises the marker indicated generally at 18, which as shown also serves as an approximate locator for receiving the work gear 14 between centers. In operation the work gear is picked up so that it runs in clearance with respect to the marker and locator. It is also within the contemplation of the present invention that one or two locators completely independent of the marker may be employed.

The marker structure comprises a body 80 having a plurality of cylindrical passages 82 formed therein each terminating in one of the openings 84 provided in the concave cylindrical surface 86 which lies in close proximity to a cylindrical shaft portion 88 of the gear 14.

Carried by the body 80 is marker ribbon which for example may be ordinary two-color typewriter ribbon 90 carried on a spool 92 mounted on a pin 94. The ribbon 90 is located by guides 96, 98, and a bar 100, so that it moves horizontally as shown through a slot 102 which intersects the upper ends of the cylindrical passages 82. Movable longitudinally of the cylindrical passages 82 are pistons 104 having printing elements 106 at their upper ends. Preferably, the printing elements are formed of a suitable plastic material such as neoprene. The body 80 has a lower surface 108 adapted to fit a supporting and air connection member 110 having openings 111 for connection to three independent sources of air under pressure. The openings 111 connect with vertical passages 112 and these in turn register and afford an air connection to the lower ends of the cylindrical passages 82. The sensitive measuring instruments 66, which are adapted to be actuated when a nick on one of the gear portions passes through the zone of mesh with its corresponding master gear, operate suitable valve means which admits a pulse of compressed air to the appropriate one of the openings 111, depending upon which one of the gear elements contains the nick. This pulse of compressed air moves the printing piston 104 upwardly in its cylindrical passages 82 and the printing element engages the ribbon and makes a mark on a cylindrical shaft portion of the gear 14. As best seen in FIGURE 7, it will be observed that the openings 84 are spaced axially from one another so that the indication on the shaft, assuming a two-color ribbon is present, may be of either of the two colors of the ribbon or if the central cylinder is energized the indication on the shaft may be formed partly of each of the two colors.

As best indicated in the diagram of FIGURE 8, there is shown the means for admitting a pulse of compressed air to the cylindrical passages 82 for moving the piston 104 therein and for venting the cylindrical passages so that when the printing element contacts the work gear through the printing ribbon, it bounces away from it quickly, thus making a clear cut mark on the shaft. Accumulator means 113 is provided for accumulating a small charge of air under pressure. This may be specially provided chamber means or it is ordinarily satisfactory to employ a portion of a passage as an accumulator chamber. Solenoid actuated valve means, indicated generally at 114, is operative in one position to admit pressure from a source P to the accumulator and to close off communication from the accumulator to the openings 111 communicating through passages 112 to the cylindrical passages 82. In the other position the valve means 114 is operative to disconnect the source of pressure P from the accumulator 113 and to connect the accumulator chamber to the passage 112. There is thus provided a measured charge of air under pressure when the valve means 114 is actuated as a consequence of determination by the gear checker that one of the gear elements of the cluster gear has a disqualifying nick on a tooth thereof.

Each of the cylindrical passages 82 has an exhaust port 115 therein located at a position such that it is uncovered by passage of the piston 104 thereover just prior to impact of the printing element 106 through the ribbon 90 on the shaft 88 of the cluster gear 14. With this arrangement, and since actuation of the piston 104 has been by a small measured charge of compressed air, the air pressure within the cylinder in back of the piston 104 is vented just prior to impact so that upon impact the printing element and the cylinder carrying it bounce quickly away from the shaft of the gear, thus leaving a clear cut printing impression thereon.

Means are also provided to effect automatic advancing movement of the ribbon 90 upon each actuation of a printing cylinder and this means comprises the ratcheted spool 116 provided with a resilient holding pawl 118 and a feeding pawl 120. The feeding pawl is carried by a piston 122 movable vertically in a cylinder 124. The resilient feeding pawl extends through a slot 126 and is biased downwardly by a compression spring 128. The cylinders 82 have passages 130 normally disconnected from the pressure source by the pistons 104, but adapted to be opened into communication with a cross passage 132 when any one of the pistons 104 moves vertically on its printing stroke. This admits a pulse of high pressure air through passages 132, 134 and 136 to the underside of the cylinder 124, thus moving the piston 122 upwardly and rotating the ratcheted spool 116 in a direction to advance the printing ribbon.

While it is of course possible to provide predetermined delay between sensing of a nick and the printing operation so that the mark applied to the shaft of the cluster gear could be in exact registration with the nick, this is not ordinarily necessary and in practice the mark on the shaft of the gear indicating the presence of a nick on one of the gears of the cluster will be angularly displaced from the nick by a predetermined amount such as for example 90 degrees. In any case, the location of the mark on the shaft is an indication of the location of the nick on the gear and permits the operator to locate the nick for visual inspection and correction if desired.

It will thus be seen that the gear checking apparatus not only determines the presence of nicks, but may be adjusted to determine the magnitude of the nick by appropriate adjustment of adjusting screw 70 and will also automatically determine which of a plurality of cluster gears has the nick and further, the angular location of the nicked tooth on the gear, and will mark the gear to apply an indication thereon both as to which of the gears is nicked and the location of the nick on the gear.

The inertia nick checker which has been described in detail in the foregoing may of course be combined at a single station so that movement and position of the master gear 12 may indicate the size of the work gear, run-out or eccentricity thereof, and helix angle errors by sensing rotational movement of the master gear about an axis perpendicular to its own axis and the axis of the work gear, as fully described in Gates Patent 2,983,375.

The drawings and the foregoing specification constitute a description of the improved gear checking apparatus in such full, clear, concise and exact terms as to enable any person skilled in the art to practice the invention, the scope of which is indicated by the appended claims.

What I claim as my invention is:

1. A gear checker comprising means for rotating a work gear, means for rolling the gear in tight mesh with a master gear, means for sensing abrupt spacing errors such as caused by nicks by relative radial displacement between said gears, and marking means actuated by the sensing means to mark the gear at a position dependent on the circumferential location of the error, said marking means comprising a printing ribbon, and an impact printing element movable to impinge the ribbon against a surface of the gear.

2. A checker as defined in claim 1 in which the marking means comprises a cylinder, and the printing element comprises a piston movable in said cylinder.

3. A checker as defined in claim 2 comprising accumulating means for accumulating a small quantity of air under pressure, means responsive to operation of said sensing means to connect said accumulating means to said cylinder.

4. A checker as defined in claim 3 comprising an actuated ribbon feed mechanism, and means responsive to movement of said piston in said cylinder to connect said cylinder to said mechanism.

5. A checker as defined in claim 3 in which said cylinder includes an exhaust port in position to be uncovered by said piston just prior to impact by the printing element on the work gear.

6. A checker as defined in claim 4 in which said cylinder includes an exhaust port in position to be uncovered by said piston just prior to impact by the printing element on the work gear.

7. A gear checker for checking a cluster gear having a shaft section adjacent one of its gear sections for abrupt spacing errors such as nicks, and for marking the cluster gear to indicate which of the gear elements thereon has a nick and the circumferential location of the nick comprising a rotary support for the cluster gear, a plurality of independently movable rotary supports for supporting a master gear in tight mesh with each gear element of the cluster gear, means for rotating said cluster gear in mesh with a plurality of master gears carried by said independently movable rotary supports, marking means responsive to abrupt movement of any one of said independently movable supports to apply a mark to the shaft section of the cluster gear during continued rotation thereof indicative of which of the gear elements thereof is nicked and the location of the nick thereon.

8. A checker as defined in claim 7 in which the marking means comprises a plurality of impact printing elements associated respectively with each gear element, and a printing ribbon located between each printing element and the cluster gear.

9. A checker as defined in claim 8 in which said ribbon comprises a multi-color typewriter ribbon, and said printing elements are located to print marks of different colors on the cluster gear.

10. A checker as defined in claim 9 in which the marking means includes a plurality of cylinders and in which the printing elements include piston portions movable in the cylinders, an accumulator for each cylinder, valve means responsive to abrupt movement of each master gear to connect one of said accumulators to its associated cylinder, and a vent port in each of said cylinders uncovered by movement of the piston portion therein just prior to impact of the printing element on the work gear 11. A checker as defined in claim 10 comprising an actuated ribbon feeding mechanism and an air passage connecting said mechanism to each of said cylinders at a port uncovered by movement of the piston portion of the printing element.

References Cited by the Examiner

UNITED STATES PATENTS

| 2,571,161 | 10/1951 | Poole | 33—174 |
| 2,587,774 | 3/1952 | Shack | 33—174 |
| 2,727,311 | 12/1955 | Aller | 33—174 |
| 2,956,345 | 10/1960 | Dinger | 33—179.52 |
| 2,965,971 | 12/1960 | Pomernacki | 33—179.52 |

FOREIGN PATENTS 904,128    2/1954    Germany.

LEONARD FORMAN, *Primary Examiner.*